US006524412B2

(12) United States Patent
Smith

(10) Patent No.: US 6,524,412 B2
(45) Date of Patent: Feb. 25, 2003

(54) METHOD FOR FORMING AND APPLYING A ROADSIDE DISPLAY SYSTEM

(76) Inventor: Phillip L. Smith, 3503-52nd St., Lubbock, TX (US) 79413

( * ) Notice: Subject to any disclaimer, the term of this patent is extended or adjusted under 35 U.S.C. 154(b) by 94 days.

(21) Appl. No.: 09/804,445

(22) Filed: Mar. 12, 2001

(65) Prior Publication Data

US 2002/0124951 A1 Sep. 12, 2002

(51) Int. Cl.[7] ............................ B32B 31/00; E01F 9/04

(52) U.S. Cl. ........................ 156/71; 156/264; 156/293; 156/298; 156/308.6; 156/263; 40/594; 40/595; 40/596; 40/612; 404/94; 427/137; 427/207.1; 427/290

(58) Field of Search .......................... 40/594, 595, 596, 40/612; 404/94; 427/137, 207.1, 290; 156/71, 264, 293, 298, 263, 308.6

(56) References Cited

U.S. PATENT DOCUMENTS

| | | | | | |
|---|---|---|---|---|---|
| 1,051,354 | A | | 1/1913 | Strachan | |
| 1,994,937 | A | | 3/1935 | Berger | 40/140 |
| 2,411,187 | A | | 11/1946 | Boogher | 40/125 |
| 3,230,842 | A | * | 1/1966 | Denton et al. | 156/71 |
| 3,506,528 | A | | 4/1970 | Dean | 161/44 |
| 3,902,939 | A | * | 9/1975 | Eigenmann | 156/71 |
| 4,040,760 | A | * | 8/1977 | Wyckoff | 404/14 |
| 4,246,709 | A | | 1/1981 | Selleslags | 40/2 R |
| 4,479,319 | A | | 10/1984 | Erlich | 40/595 |
| 4,842,921 | A | | 6/1989 | Sorko-Ram | 428/187 |
| 4,888,896 | A | * | 12/1989 | Sanchez | 40/630 |
| 5,255,587 | A | | 10/1993 | Eichenberg et al. | 83/628 |
| 5,585,160 | A | | 12/1996 | Østhassel | 428/66.5 |
| 5,621,993 | A | | 4/1997 | Stover | 40/638 |
| 5,678,337 | A | * | 10/1997 | Ashoori | 40/594 |

FOREIGN PATENT DOCUMENTS

| | | | |
|---|---|---|---|
| GB | 1 238 097 | * | 7/1971 |
| NL | 7507839 | | 1/1977 |

* cited by examiner

*Primary Examiner*—Linda Gray
(74) *Attorney, Agent, or Firm*—Jackie Lee Duke

(57) ABSTRACT

A method for forming and applying a roadside display system is disclosed. Character-shaped are formed in a thermoplastic polymer resin material with a highly reflective face. A readily available sheet cutting die press allows the characters, numerals or letters, to be cut on site with a minimum of effort. Typically, a matching set of character-shaped inserts are cut from a second sheet of thermoplastic polymer resin material with a different color, contrast and reflectance. The inserts are placed in the corresponding character-shaped apertures cut in the first sheet and then a reactant, in the form of contact cement, is used to adhere the sign to a roadside curb. An exothermic reaction occurs between the reactant and thermoplastic polymer resin material which adheres the thermoplastic polymer resin material to the curbside. In order to ensure complete bonding between the thermoplastic polymer resin material and the curbside, a weighted roller is rolled over the thermoplastic polymer resin material to press it against the curbside.

8 Claims, 2 Drawing Sheets

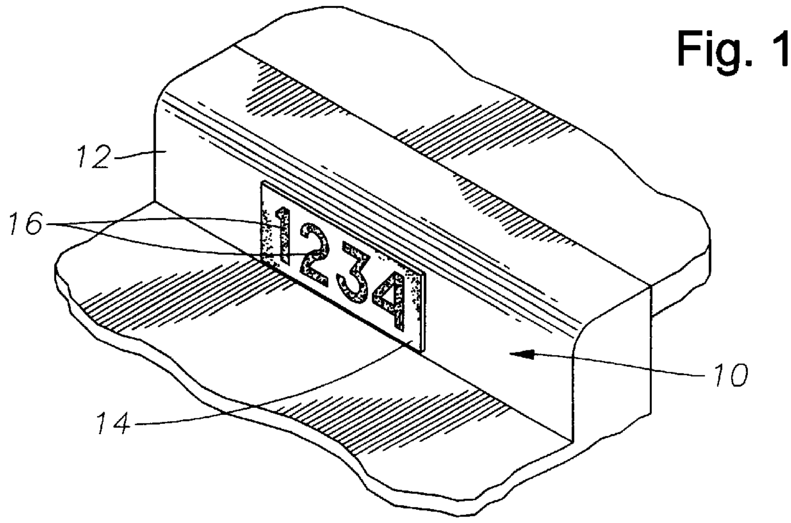
Fig. 1
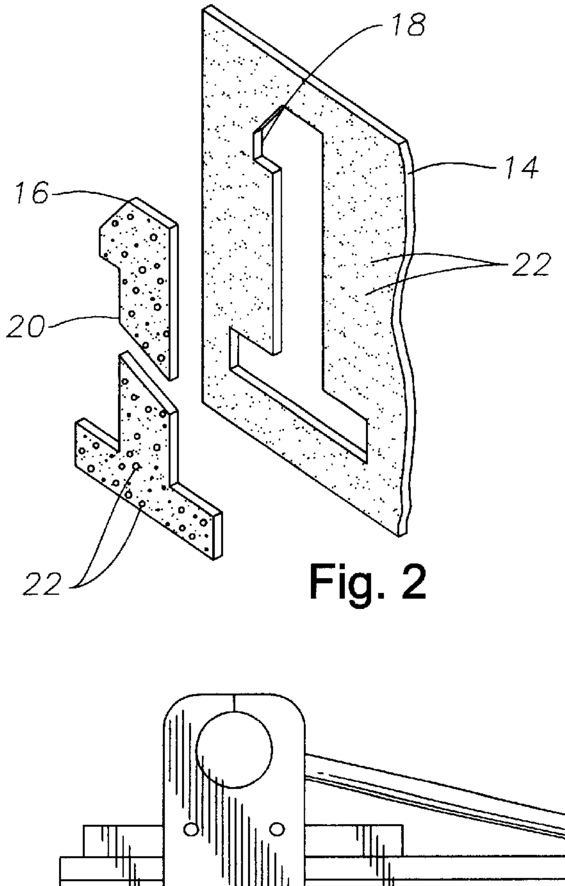
Fig. 2
Fig. 4
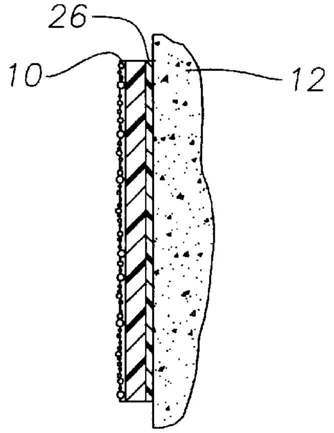
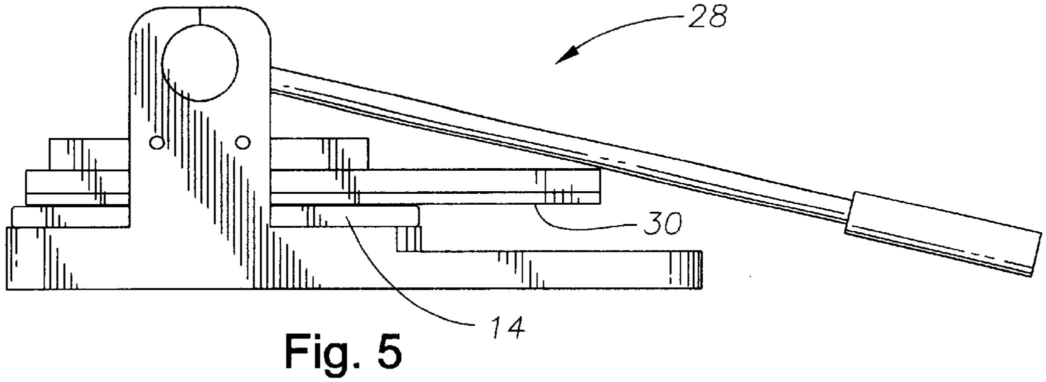
Fig. 5

METHOD FOR FORMING AND APPLYING A ROADSIDE DISPLAY SYSTEM

BACKGROUND OF THE INVENTION

1. Field of the Invention

This invention relates to the field of curbside display sign. More specifically, the invention relates to a method for forming and applying roadside displays, such as street addresses and street names, to the curb or other roadside feature, such as a driveway.

Curb, or roadside, markers have long been used to indicate the specific address location. Typically, these markers consist of numbers and letters that specify the address on the particular street and are useful for visitors, delivery people, and emergency personnel searching for a particular address. Although there are many methods of indicating the address, such as numbers mounted on the building, specialized number plaques mounted on the property, and numbers placed on the mailbox, one of the more common marking methods is to paint the numbers (i.e. address information) on the curb or driveway of the location. Painting the numbers on the roadside is relatively inexpensive, flexible, and simple to apply. The painted numbers may be individualized to incorporate logos or other indicia (e.g. the logo of an alma mater or a symbol relating to the person's beliefs) that the person desires.

However, the painted address tends to wear and fade over time when exposed to the weather and traffic. Thus, in order to maintain an appealing marker and one that may be easily seen and used by those searching for a particular address, the marker must be repainted relatively frequently, thereby reducing the cost efficiency and utility of the painted numbers. Thus, despite the use of the known roadside marking systems, there remains a need for a marking system that is relatively inexpensive, mounts to the roadside, is durable, and does not fade over time.

Another somewhat related problem deals with the marking of street names by cities. Because of the importance of the street name marking, in that a very high number of people rely on the information for finding their destination, governmental entities typically use street signs mounted on poles to indicate the street names. While effective, the street signs suffer from the drawback that they are relatively expensive and easy to steal. Thus, cities and other governmental entities must spend substantial funds installing street signs and replacing stolen street signs. Additionally, the street signs may act as a road hazard, in the event of an accident, and exacerbate the damage to an automobile or its passengers that inadvertently leave the roadway during the accident.

One manner to overcome these drawbacks is to paint the street names on the curb, or roadside, where they may be used by a passerby. However, as previously discussed, indicia painted on the roadside tends to wear and fade when exposed to the weather and traffic and must, therefore, be repainted periodically. Due to the high number of street markers encountered in a typical city, such a system of painted street markers is simply impractical and unworkable. Accordingly, there is a need for a system to replace the current system of street signs that cannot be stolen, that does not create an additional road hazard, and that is durable and provides an easy-to-see street marker.

2. Description of Related Art

U.S. Pat. No. 1,051,354 to J. Strachan shows an early system for attaching a curb shaped sign to an inset in the curb.

An improved method and apparatus for applying an adhesive based sign is disclosed in U.S. Pat. No. 4,479,319 to E. Erlich. This method uses adhesive selectively applied to the characters in a material strip that is applied to a surface and then removed to leave the characters attached to the surface.

U.S. Pat. No. 4,842,921 to P. O. Sorko-Ram shows a method of forming a mirror from thermoplastic materials with a character insert.

SUMMARY OF THE INVENTION

The method for forming and applying a roadside display system of the present invention is designed for use in the field without requiring any large computer controlled die cutting machinery. A readily available sheet cutting die press allows the characters, numerals or letters, to be cut on site with a minimum of effort. Additionally, the sheet cutting die press can accommodate dies to cut out other characters as state outlines, college logos, and the like. The method for forming and applying a roadside display system of the present invention uses a sheet of a thermoplastic polymer resin material that has a light reflective coating of microspheres embedded in its face. The sheet of thermoplastic polymer resin material is placed in the sheet cutting die press and the numerals or letters are cut out of the sheet of thermoplastic polymer resin material. Typically, a second sheet of thermoplastic polymer resin material with a different color, contrast and reflectance is placed in the sheet cutting die press. Numerals (or letters) corresponding to those cut in the first sheet of thermoplastic polymer resin material are cut from the second sheet. The numerals (or letters) thus cut are then placed in the corresponding apertures cut in the first sheet of thermoplastic polymer resin material. The back of the first sheet of the thermoplastic polymer resin material (with the inserted characters from the second sheet of thermoplastic polymer resin material therein) is then coated with a reactant, in the form of contact cement. The same reactant is then applied to the curb surface where the roadside display is to be attached. The first sheet of the thermoplastic polymer resin material (with the inserted characters from the second sheet of thermoplastic polymer resin material therein) is pressed into place on the curbside. An exothermic reaction occurs between the reactant and thermoplastic polymer resin material which adheres the thermoplastic polymer resin material to the curbside. In order to ensure complete bonding between the thermoplastic polymer resin material and the curbside, a weighted roller is rolled over the thermoplastic polymer resin material to press it against the curbside.

A principal object of the present invention is to provide a method for applying a roadside display system to a curbside or similar location that is durable and highly reflective.

Another object of the present invention is to provide a method for applying a roadside display system to a curbside or similar location that is easily applicable to a curved surface.

A final object of the present invention is to provide a method for applying a roadside display system to a curbside or similar location that is easily useable in the field and allows the use of contrasting characters and background.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein:

FIG. 1 is a perspective view of a roadside display sign utilizing the method of the current invention.

FIG. 2 is a perspective view of the first member of the roadside display sign showing the character-shaped aperture therein and the corresponding character-shaped insert aligned therewith.

FIG. 4 is a side elevational, cross sectional view of the sign applied to a roadside curb.

FIG. 5 is a side elevational view of a sheet cutting die press.

DESCRIPTION OF THE PREFERRED EMBODIMENT

Figure 3:
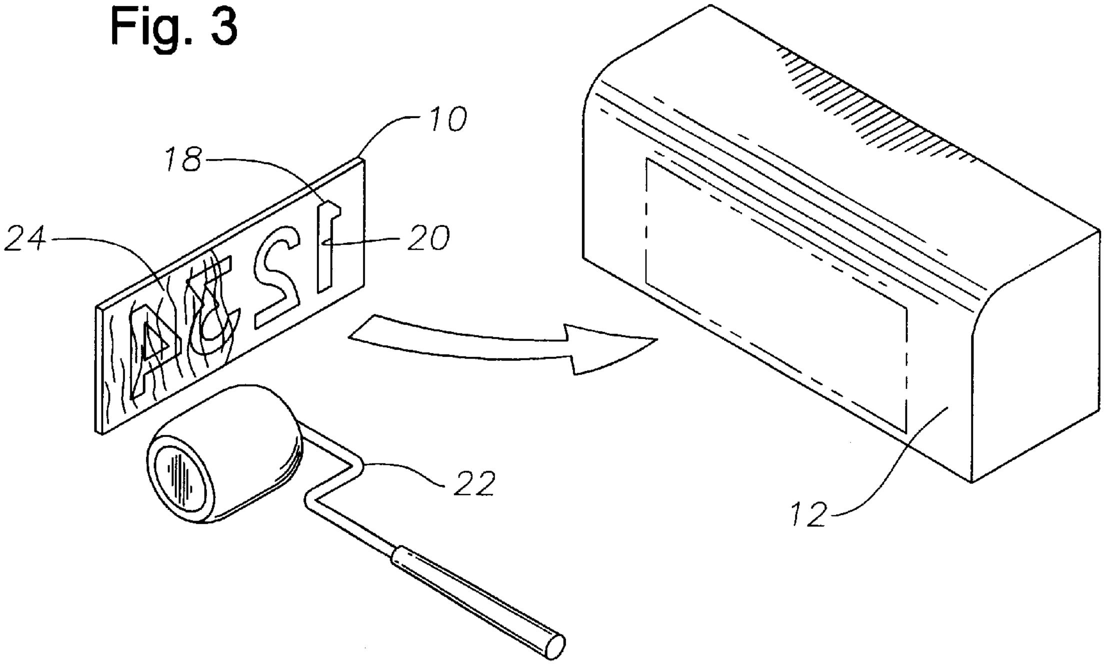
FIG. 3 is a perspective view of the sign having the reactant applied to its back surface before attachment to the roadside curb.

With reference to the drawings, and particularly to FIG. 1, a perspective view of a roadside display sign utilizing the method of the current invention is shown. Roadside display sign 10 shown adhered to roadside curb 12. Roadside display sign is composed of a sheet of a first thermoplastic polymer resin material 14 with characters, in this case the numerals 1–4, formed from a sheet of a second thermoplastic polymer resin material 16. As may be seen in greater detail in FIG. 2, a sheet of a first thermoplastic polymer resin material 14 has character-shaped aperture 18 in the form of numeral 1 cut therein. The sheet of a first thermoplastic polymer resin material 14 is typically six inches in height to allow character-shaped apertures 18 to be sufficiently large to be readily visible from the road. Character-shaped insert 20 is cut from a sheet of a second thermoplastic polymer resin material 16. Sheets 14 and 16 have microspheres 22 embedded in their face to enhance reflectivity and therefor visibility. Sheets 14 and 16 are typically chosen to be different colors and therefore have different reflectivity characteristics. Sheets 14 and 16 are made from a commercially available thermoplastic polymer resin material sold under the tradename "HOTTAPE" by Avery Dennison.

Referring now to FIG. 3, roadside display sign 10 is being prepared for adherence to roadside curb 12. The sheet of a first thermoplastic polymer resin material 14 has character-shaped apertures 18 cut therein and character-shaped inserts 20 have been inserted therein to form a single sheet. Roller 24 or similar applicator such as a brush is used to apply reactant 26 to the back of roadside sign 10. Reactant 26 is also applied to the face of roadside curb 12. Roadside sign 10 is then pressed into contact with roadside curb 12. A weighted roller (not shown) may then be rolled over roadside sign 10 to ensure its adherence to roadside curb 12. Testing has shown that only #028 contact cement as sold by Capitol USA, LLC of Dalton, Ga. works as a reactant. Extensive testing of over one hundred compounds has shown this is the only reactant that will cause an exothermic reaction with the thermoplastic polymer resin material of roadside sign 10 and allow roadside sign 10 to bond properly with roadside curb 12.

The reactant causes an exothermic reaction to occur and the rear of roadside sign 10 to soften to a plastic or semi-liquid state. When roadside sign 10 is then applied to roadside curb 12, roadside sign 10 bonds to roadside curb 12. After the exothermic reaction subsides, roadside sign 10 is adhered to roadside curb 12 so well that attempts at subsequent removal require the use of hammer and chisel.

FIG. 4 shows a section view of roadside sign 10 after being applied to roadside curb 12. Reactant 26 is interposed between roadside sign 10 and curb 12 to form a secure bond therebetween.

FIG. 5 shows a side elevational view of a sheet cutting die press 28 used in the method of making the roadside signs 10. The sheet cutting die press 28 may take many forms, but must be adapted to receive a character die 30 that defines the desired character and, using the character die 30, be capable of selectively punching the character-shaped apertures 18 from the sheet of a first thermoplastic polymer resin material 14 and punching the character-shaped inserts 20 from the sheet of a second thermoplastic polymer resin material 16. Such a machine is disclosed in U.S. Pat. No. 5,255,587 that issued to Eichenberg et al. on Oct. 26, 1993 which is hereby incorporated herein by reference.

To form the roadside display sign, the character die 30 for the first desired character is selected and positioned in the sheet cutting die press 28. The sheet of a first thermoplastic polymer resin material 14 is positioned in the sheet cutting die press 28 and aligned with the character die 30 for proper placement of the character-shaped aperture 18. Once the sheet of a first thermoplastic polymer resin material 14 is properly aligned, the sheet cutting die press 28 is actuated to punch the desired character-shaped aperture 18 in the sheet of a first thermoplastic polymer resin material 14. The next desired character die 30 is selected and positioned in the sheet cutting die press 28. The sheet of a first thermoplastic polymer resin material 14 is repositioned to realign the character die 30 therewith for proper placement of the second character-shaped aperture 18. Then, the sheet cutting die press 28 is actuated to punch the second character-shaped aperture 18 in the sheet of a first thermoplastic polymer resin material 14. This process is repeated to punch additional character-shaped apertures 18 in the first material using the sheet cutting die press 28. After all of the character-shaped apertures 18 are punched from the sheet of a first thermoplastic polymer resin material 14, the sheet cutting die press 28 is then used to punch the character-shaped inserts 20 from the sheet of a second thermoplastic polymer resin material 16. For efficiency, it may be more preferable to punch character-shaped aperture 18 and then corresponding character-shaped insert 20 before proceeding to the next character to reduce the number of times the character dies 30 must be changed in the sheet cutting die press 28. The desired character die 30 is placed in the sheet cutting die press 28. The second sheet of material 16 is positioned in the sheet cutting die press 28 and the sheet cutting die press 28 is actuated to punch the character-shaped insert 20 from the second material. The character-shaped insert 20 should correspond to one of the character-shaped apertures 18 in the first member 14 as previously described. The character die 30 may be selectively replaced with other desired character dies 30 and additional character-shaped inserts 20 punched from the second sheet 16 by repeating this process. Rather than using only a single second material, the character-shaped inserts 20 may be punched from a plurality of additional materials, each having different reflection attributes. In this way, character-shaped inserts 20, as an example, may each have a different color from one another and from the first sheet 14. The additional materials from which character-shaped inserts 20 are punched allow for greater variation of color and styles available for the roadside sign 10. Once character-shaped inserts 20 are formed using this procedure, character-shaped inserts 20 are positioned in the corresponding character-shaped apertures 18 and adhered to the roadside curb 12 as described previously.

Figure 6:
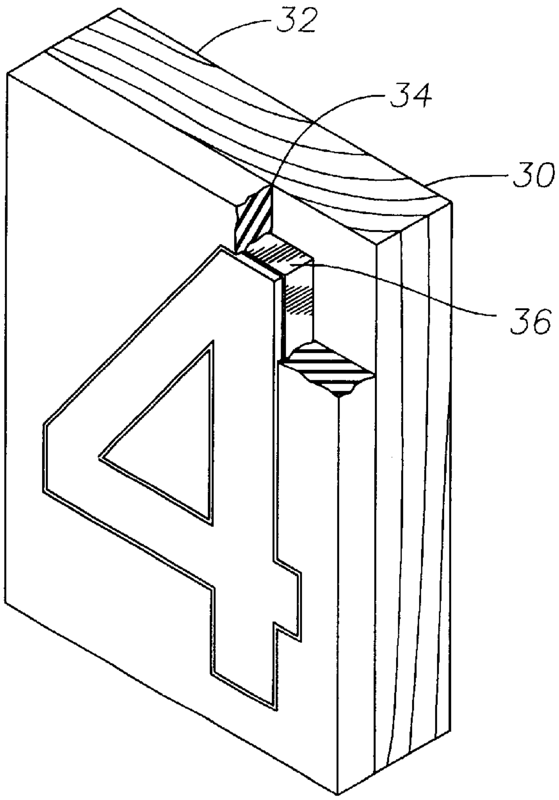
FIG. 6 is a perspective view of a die to be used in the sheet cutting die press.

The details of character dies 30 are shown in FIG. 6. Character die 30 includes wooden backing plate 32, foam rubber pad 34 and metal character cutter blade 36.

Wooden backing plate 32 has foam rubber pad 34 attached to its face by gluing or other similar means. Positioned within foam rubber pad 34 is metal character cutter blade 36, shaped into the desired character to be punched, that is embedded in wooden backing plate 32. Foam rubber pad 34 surrounds metal character cutter blade 36 and is pressed away from metal character cutter blade 36 when character die 30 is pressed into material 14 or 16 to form character-shaped apertures 18 or character-shaped inserts 20.

The application of my method for forming and applying roadside displays, such as street addresses and street names, to the curb or other roadside features, such as a driveway will be readily understood from the foregoing description and it will be seen that I have provided a method for forming and applying roadside displays that does not require the use of large computer controlled equipment or heating equipment to form and apply the roadside displays. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A method of preparing and applying a curbside display system, comprising the steps of:

providing a sheet of a first material sized to fit on a roadside curb having a thermoplastic polymer resin back and a reflective face;

positioning said sheet of a first material in a sheet cutting die press having a desired character die therein;

actuating said sheet cutting die press to punch a desired character-shaped aperture in said first sheet of a first material;

selectively repositioning said sheet of a first material in said sheet cutting die press, placing a desired character die in said sheet cutting die press, and actuating said sheet cutting die press to punch additional character-shaped apertures in said sheet of a first material;

providing a sheet of a second material having a thermoplastic polymer resin back and a reflective face, said sheet of a second material having different reflectivity characteristics than said sheet of a first material;

positioning said sheet of a second material in a sheet cutting die press having a desired character die therein, said character die selected to produce a character-shaped insert having the same shape and size as one of the character-shaped apertures in said sheet of a first material;

actuating said sheet cutting die press to punch said desired character-shaped insert from said sheet of a second material;

selectively positioning said second sheet of a second material in said sheet cutting die press, placing a desired character die in said sheet cutting die press, and actuating said sheet cutting die press to punch additional character-shaped inserts in said sheet of a second material that have the same shape and size as one of said character-shaped apertures in said sheet of a first material;

positioning said character-shaped inserts in the corresponding character-shaped apertures in said sheet of a first material;

applying a reactant to said thermoplastic polymer resin back of said sheet of a first material with said character-shaped inserts positioned therein;

allowing an exothermic reaction to occur between said reactant and said thermoplastic polymer resin back of said sheet of a first material to soften said thermoplastic resin to a plastic state;

applying the reactant to said roadside curb; and, adhering said sheet of a first material with said character-shaped inserts positioned therein to said roadside curb.

2. A method of preparing and applying a curbside display system according to claim 1, further comprising the steps of:

using a weighted roller to roll over said sheet of a first material applied to said roadside curb and ensure complete bonding between said sheet of a first material and said roadside curb.

3. A method of preparing and applying a curbside display system according to claim 1, further comprising the steps of:

providing at least one additional sheet of a third material having a different color than said sheets of a first material and a second material;

positioning said at least one additional sheet of a third material in a sheet cutting die press having a desired character die therein, said character die selected to produce a character-shaped insert having the same shape and size as one of the character-shaped apertures in said sheet of a first material;

actuating the sheet cutting die press to punch said desired character-shaped insert from said at least one additional sheet of a third material; and selectively positioning one of said at least one additional sheet of a third material in the sheet cutting die press, placing a desired character die in the sheet cutting die press, and actuating the sheet cutting die press to punch additional character-shaped inserts in said at least one additional sheet of a third material that have the same shape and size as at least a portion of one of the character-shaped apertures in said sheet of a first material;

applying a reactant to said thermoplastic polymer resin back of said sheet of a first material with said character-shaped inserts positioned therein;

allowing an exothermic reaction to occur between said reactant and said thermoplastic polymer resin back of said sheet of a first material to soften said thermoplastic resin to a plastic state;

applying the reactant to said roadside curb; and, adhering said sheet of a first material with said character-shaped inserts positioned therein to said roadside curb.

4. A method of preparing and applying a curbside display system according to claim 3, further comprising the steps of:

using a weighted roller to roll over said sheet of a first material applied to said roadside curb and ensure complete bonding between said sheet of a first material and said roadside curb.

5. A method of preparing and applying a curbside display system, comprising the steps of:

providing a sheet of a first material sized to fit on a roadside curb having a thermoplastic polymer resin back and a reflective face;

positioning said sheet of a first material in a sheet cutting die press having a desired character die therein;

actuating said sheet cutting die press to punch a desired character-shaped aperture in said first sheet of a first material;

selectively repositioning said sheet of a first material in said sheet cutting die press, placing a desired character die in said sheet cutting die press, and actuating said sheet cutting die press to punch additional character-shaped apertures in said sheet of a first material;

applying a reactant to said thermoplastic polymer resin back of said sheet of a first material with said desired character-shaped apertures therein;

allowing an exothermic reaction to occur between said reactant and said thermoplastic polymer resin back of said sheet of a first material to soften said thermoplastic resin to a plastic state;

applying the reactant to said roadside curb; and, adhering said sheet of a first material with said desired character-shaped apertures therein to said roadside curb.

6. A method of preparing and applying a curbside display system according to claim 5, further comprising the steps of:

using a weighted roller to roll over said sheet of a first material applied to said roadside curb and ensure complete bonding between said sheet of a first material and said roadside curb.

7. A method of preparing and applying a curbside display system, comprising the steps of:

providing a sheet of a first material sized to fit on a roadside curb having a thermoplastic polymer resin back and a reflective face;

positioning said sheet of a first material in a sheet cutting die press having a desired character die therein, said character die selected to produce a character-shaped insert having a desired shape and size for attachment to a roadside curb;

actuating said sheet cutting die press to punch said desired character-shaped insert from said sheet of a first material;

selectively positioning said sheet of a first material in said sheet cutting die press, placing a desired character die in said sheet cutting die press, and actuating said sheet cutting die press to punch additional character-shaped inserts in said sheet of a first material having a desired shape and size for attachment to a roadside curb;

applying a reactant to said thermoplastic polymer resin back of said character-shaped inserts cut from said sheet of a first material;

allowing an exothermic reaction to occur between said reactant and said thermoplastic polymer resin back of said sheet of a first material to soften said thermoplastic resin to a plastic state;

applying the reactant to said roadside curb; and, adhering said character-shaped inserts cut from said sheet of a first material on said roadside curb in a desired sequence.

8. A method of preparing and applying a curbside display system according to claim 7, further comprising the steps of:

using a weighted roller to roll over said character-shaped inserts cut from said sheet of a first material applied to said roadside curb and ensure complete bonding between said character-shaped inserts and said roadside curb.

* * * * *